Figure 1:
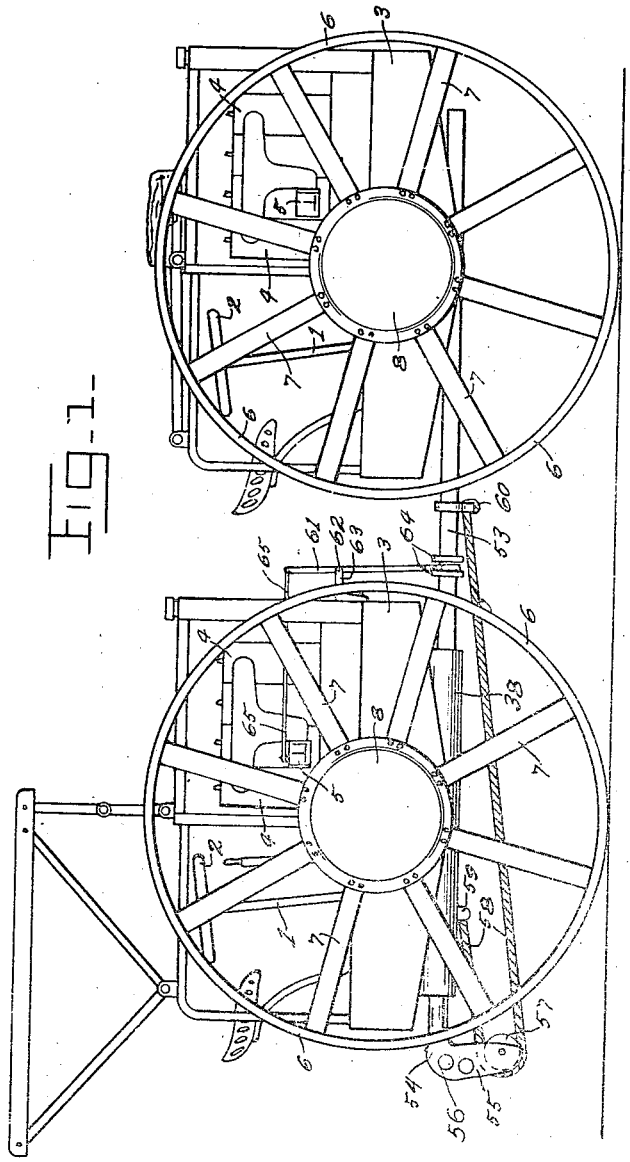

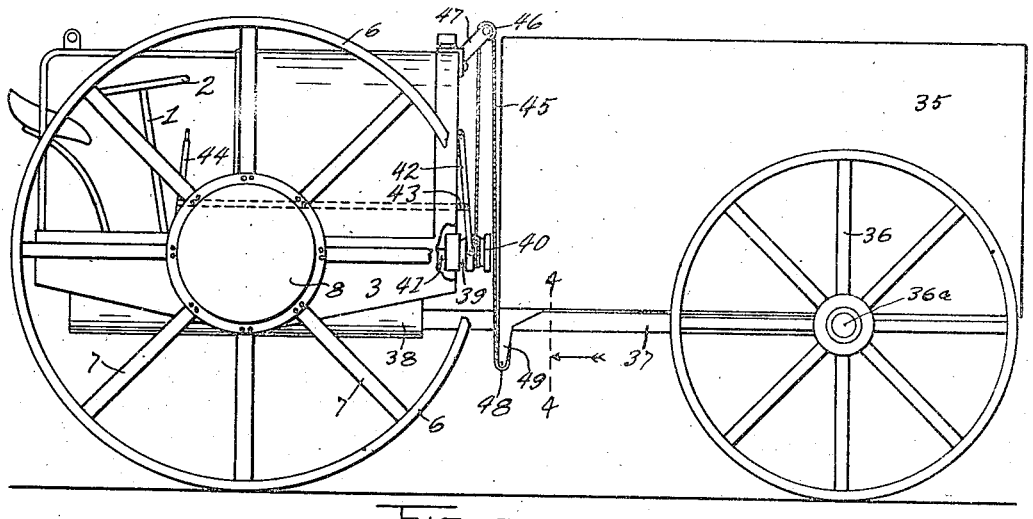
Fig. 2
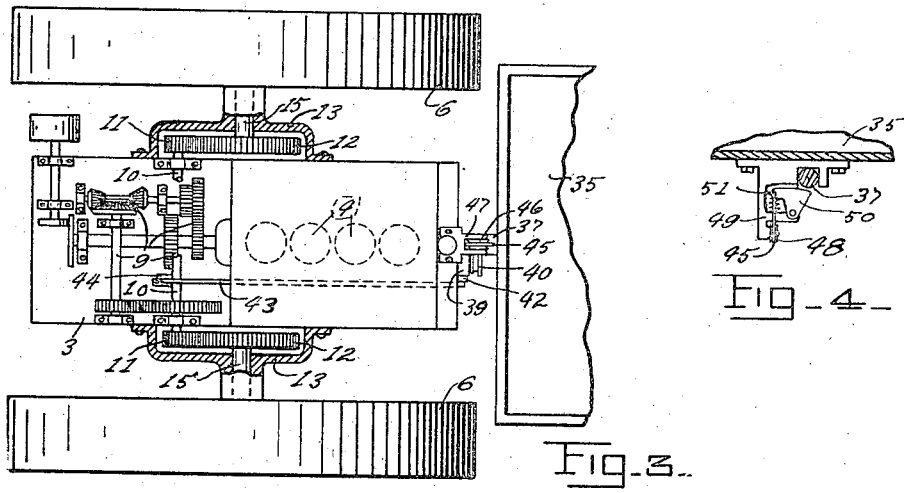
Fig. 3
Fig. 4
INVENTORS
ANDREAN G RONNING
ADOLPH RONNING
BY THEIR ATTORNEY

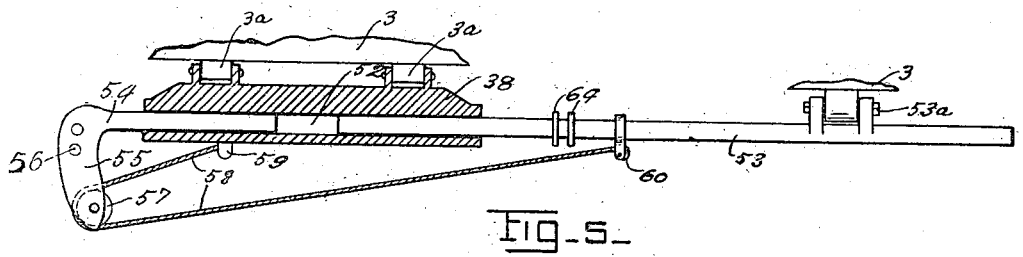
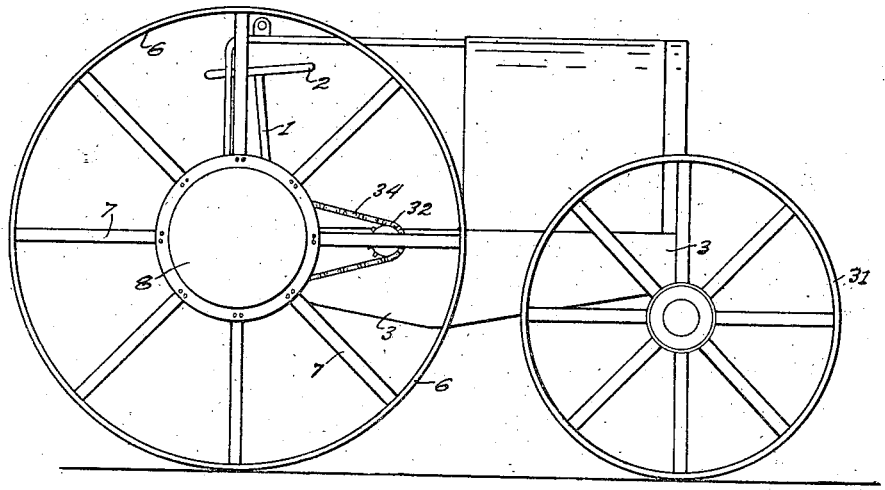

A. G. AND A. RONNING.
TRACTOR TRUCK.
APPLICATION FILED MAY 26, 1919.
1,393,972.
Patented Oct. 18, 1921.
5 SHEETS—SHEET 4.
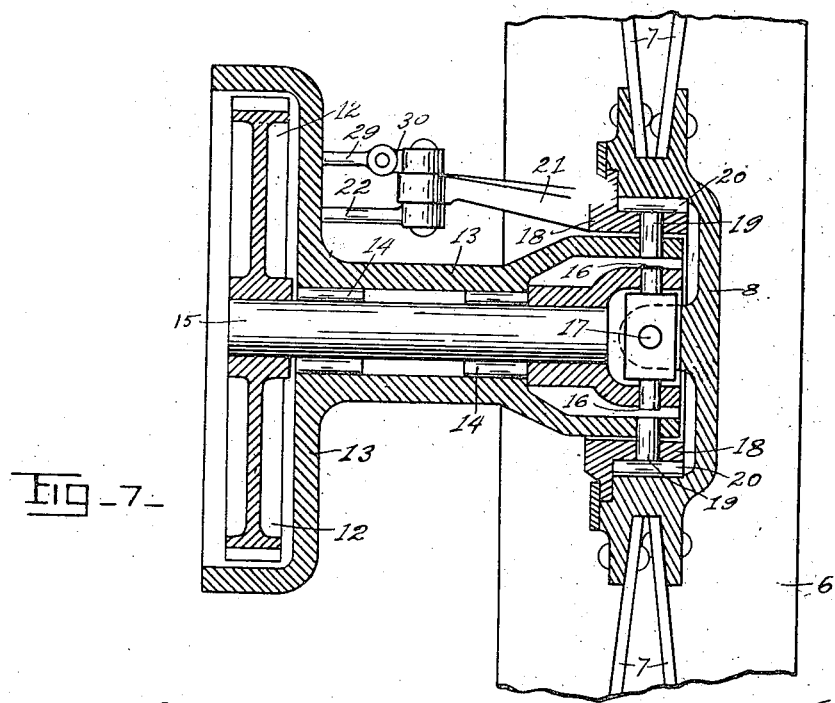
Fig-7-
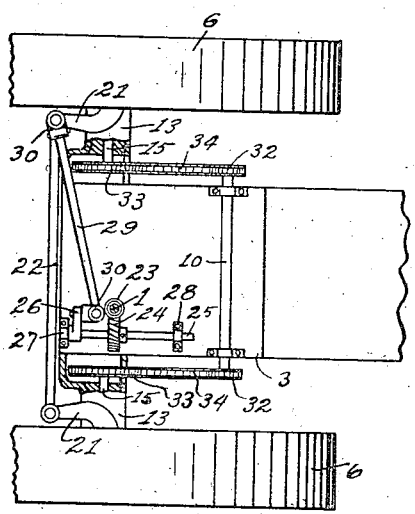
Fig-8-
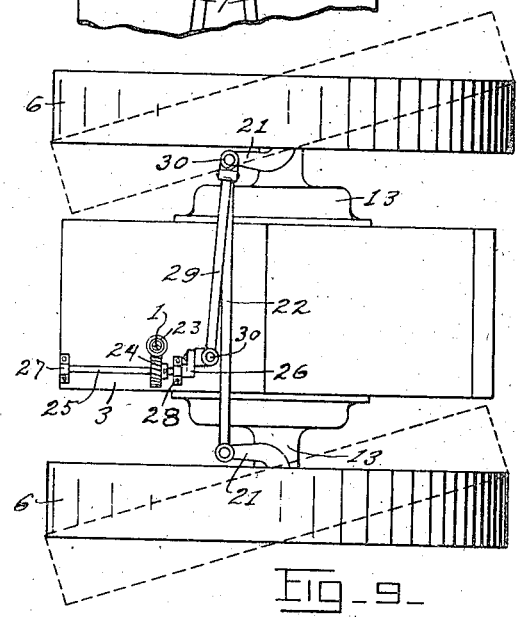
Fig-9-
INVENTORS
ANDREAN G. RONNING
ADOLPH RONNING
BY THEIR ATTORNEY
A. E. Carlsen A. G. AND A. RONNING.
TRACTOR TRUCK.
APPLICATION FILED MAY 26, 1919.
1,393,972.
Patented Oct. 18, 1921.
5 SHEETS—SHEET 5.
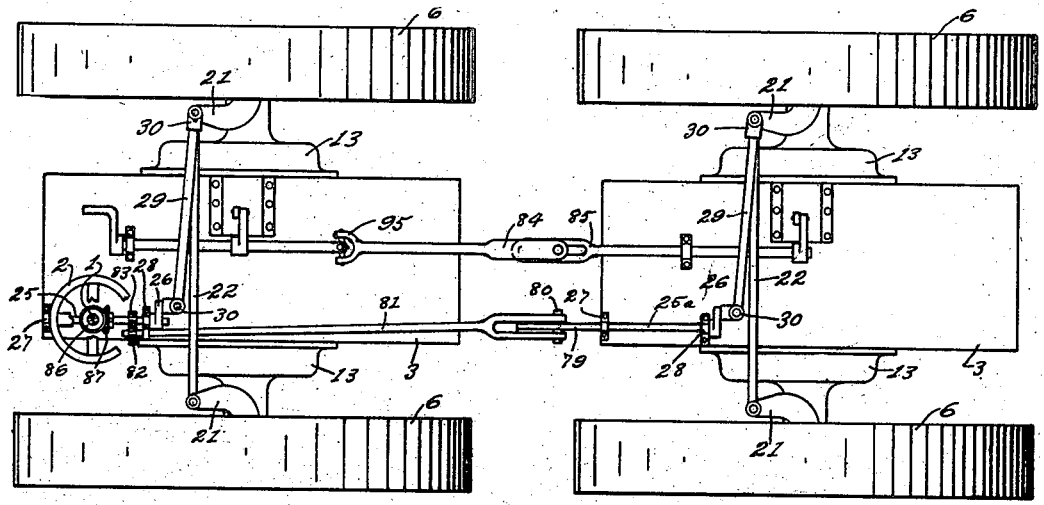
Fig. 10.
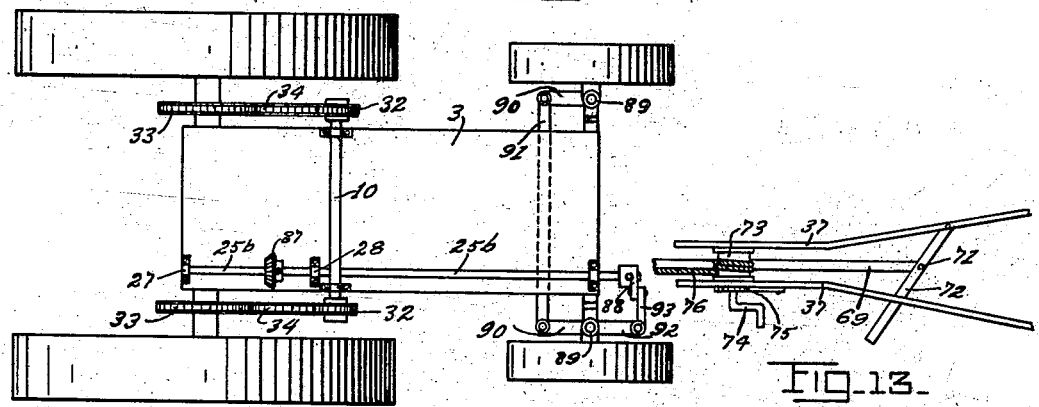
Fig. 11.
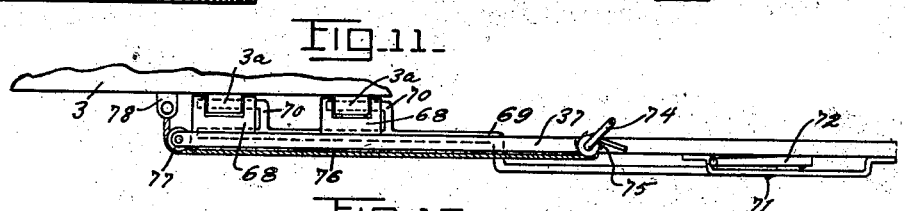
Fig. 12.
Fig. 13.
INVENTORS
ANDREAN G RONNING
ADOLPH RONNING
BY THEIR ATTORNEY
*A. E. Carlsen.*

UNITED STATES PATENT OFFICE.

ANDREAN G. RONNING AND ADOLPH RONNING, OF MINNEAPOLIS, MINNESOTA.

TRACTOR-TRUCK.

1,393,972.   Specification of Letters Patent.   Patented Oct. 18, 1921.

Application filed May 26, 1919. Serial No. 299,802.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Tractor-Trucks, of which the following is a specification.

Our invention relates to tractor trucks and the object is to provide a comparatively simple yet efficient traction machine of such construction that it can be used as a single traction unit together with a wagon box for truck purposes, or as a double unit for traction purposes thus furnishing the relatively heavier traction power needed for such work. Further specific objects of the invention will be disclosed and described hereafter in this specification. The invention is clearly illustrated in the accompanying drawings, in which:

Figure 1 is a side elevation of the tractor used in the double unit construction. Fig. 2 is a side elevation of the single traction unit showing it as used in connection with a wagon or truck box for truck purposes. Fig. 3 is a top view of the construction shown in Fig. 2, but with the greater part of the truck box and several other elements omitted. Fig. 4 is a sectional detail view on the line 4—4 in Fig. 2. Fig. 5 is a partly sectional detail view of the draft equalizing device used in the double unit construction. Fig. 6 shows a modification of the single unit tractor as it may be constructed or altered for tractor purposes as a single unit. Fig. 7 is an enlarged vertical diametrical detail section of the hub used in each traction wheel. Fig. 8 is a top view of a portion of Fig. 6 showing a modification of the structure shown in Fig. 9. Fig. 9 is a simplified top view of the single unit tractor showing the general structure of the steering mechanism. In both Figs. 8 and 9 the steering post 1 is shown in section, the steering wheel 2 not being shown in order that the parts underneath might more easily be illustrated. Fig. 10 is a top view of the double unit construction showing the method of steering both units simultaneously and illustrating the method of double unit controls. Fig. 11 is a top view of the single unit tractor showing a modification in which the steering device is adapted to actuate the front wheels. Fig. 12 is a detail view showing a preferable form of hitching mechanism adapted to be used in the tractor truck for securing the wagon truck to the tractor unit. Fig. 13 is a top view of the right end portion of Fig. 12. For the purpose of avoiding confusion the specification and claims will hereinafter refer to the double tractor construction shown in Fig. 1 as a double unit tractor; to the tractor and box construction shown in Figs. 2 and 3 as a tractor truck; to the single unit tractor as a tractor or tractor unit.

Referring to the drawings by reference numerals, 3 designates the main frame or body of the tractor, in the front end of which is located an engine or motor 4 having a carbureter 5. Each tractor unit is provided with two traction or drive wheels 6 having spokes 7 and hubs 8. Power is transmitted from the engine 4 through any suitable gearing construction 9 (a simple but illustrative arrangement being shown in Fig. 3) to the shaft 10, a part of which is broken away in Fig. 3. Each end of said shaft 10 is provided with a pinion 11 which meshes with a gear 12, both of which are inclosed in a casing 13. Said casing 13 also forms the axle or hub bearing for the wheel 6. Within said axle portion of the casing 13 is journaled in roller bearings 14 a shaft 15 (see Fig. 7), which is secured at one end in the hub of the gear 12 and has its other end connected to the universal joint 16, 17. Thus the hub 8 is brought into operative and universal connection with the shaft 15. A bearing collar 18 is pivotally secured to the casing hub 13 by two vertical pivots 19. The hub 8 rotates on said bearing collar 18 which is provided with roller bearings 20. The vertical pivots 19 allow a swinging or steering movement of the wheel 6. The steering mechanism for the wheels consists of two lever arms 21, one on each wheel and being integral with the bearing collar 18. Said lever arms 21 are pivotally connected by a link bar 22 so that the lever arms 21 will move simultaneously. The steering post 1, having the steering wheel 2, is provided at its lower end with a worm screw 23 adapted to mesh with a worm pinion 24 (see Figs. 8 and 9). Said pinion 24 is slidably secured on a shaft 25 as is also a crank arm 26, the shaft 25 being journaled in two brackets 27, 28. The crank arm 26 is connected to one of the lever arms 21 by a link 29 (see Fig. 7) each end of which is provided with similar double joints 30 for the purpose of permitting the opposite swinging movements of the arms 26 and 21. From the above description the swinging or steering of the traction wheels 6 by the steering wheel 2 and steering post 1 is clear. The object of slidably securing the worm pinion 24 and the arm 26 on the shaft 25 is to be able to utilize the same steering mechanism when the tractor is to be used as a single unit as shown in Figs. 6 and 8. The steering post 1 with the worm 23 must also be moved together with the pinion 24.

When the tractor is to be used as a single unit requiring four wheels, the same traction wheels 6, as above described may be used but are moved to the rear end of the machine, and two smaller wheels 31 (see Fig. 6) are placed at the front end of the tractor frame. In this case however the pinions 11 and gears 12 (see Fig. 3) are substituted by sprocket pinions 32 and sprocket gears 33 respectively (see Fig. 8), and are operatively connected by sprocket chains 34.

In Figs. 2 and 3 are illustrated the structure of the tractor truck. In this case a two-wheeled single unit tractor is used in connection with a box 35 mounted upon two wheels 36. The axle 36ª of the wheels 36 acts as a pivot for tilting the box 35 forward for dumping purposes. Said axle 36ª is secured to the tractor by a connecting element 37. This may be a shaft extending from the axle 36ª into the holder 38 as shown in Fig. 2, but the preferable connecting device is shown in Figs. 12 and 13, in which the underside of the frame 3 is provided with apertured lugs 3ª. These same lugs may be used to secure the holder 38 as shown in Fig. 5. In Figs. 12 and 13 it is clear that the connecting element 37 is of two spaced bars, between which are two castings 68 having ears adapted to fit over the lugs 3ª. A sliding rod 69 having two engaging hooks 70 is mounted in the connection 37 and has its rear end pivotally connected at 71 to a hand lever 72. A small drum 73 is also mounted between the bars 37 and is provided with a hand crank 74 and a tooth and dog arrangement 75. A rope 76 secured to said drum 73 is passed over a pulley 77, also mounted in the connecting element 37, and has its end secured to the tractor frame at 78. Thus when it is desired to connect the truck with the tractor the connecting shaft 37 can be lifted up by the crank arrangement until it is in place when the lever 72 is pushed forward causing the hook extensions 70 to lock the castings 68 to the lugs 3ª of the tractor.

The device for dumping the box 35 forward is shown in Figs. 2, 3 and 4. A friction clutch 39 having a small drum or spool 40 is mounted upon the front end of the drive shaft 41 of the engine in the tractor. The clutch is opened and closed by a lever arm 42, which by means of a link connection 43 is actuated by a hand lever 44. A cable 45 secured to the drum 40 passes up over a pulley 46 in a bracket 47 on the tractor, then down under a pulley 48 in a bracket 49 secured to the underside of the rear end of the box 35. The construction of the bracket 49 is shown in Fig. 4. As is there shown a recess is provided in the bracket for engaging the pole or shaft 37, the same being held therein by a spring held pivoted catch 50 which can be released only by pulling the cable 45 the end of which is attached to said catch at 51.

When it is desired to dump the box, the clutch 39 is closed by the hand lever 44 thus causing the drum 40 to pull on the cable 45, which first releases the catch 50, allowing the shaft 37 to escape, and then lifts the rear end of the box 35 to the height required for dumping the same, after which the clutch is released and the box falls back snapping into position over the shaft 37.

In the double unit tractor a draft equalizer and power regulator is used, the construction of which is shown in Figs. 1 and 5. In this event the rear unit is provided with a holder 38 (the same as that shown in the tractor unit in Fig. 2) having a longitudinal aperture 52, in the front portion of which is slidably held the rear end of a connecting shaft 53, and in the rear part of which is slidably mounted a draft bar 54. The connecting shaft 53 is secured to the front tractor unit by a connection shown in Fig. 5, which, because of the pivot 53ª, permits a relatively rocking movement of the two tractor units. The draft bar 54 is provided with a downward extension 55, having the usual clevis holes 56, and in the lower end of which is mounted a pulley 57, over which is passed a cable 58, one end being secured at 59 to the holder 38 and the other end secured to a collar 60 fixed on the connecting shaft 53. Thus the power from both tractor units will be equalized in the draft bar 55.

But no matter how well the speeds of the two motors will be regulated or adjusted it is expected that a slight variance of power under normal conditions will be had. To overcome this difficulty we provide a power regulator as shown in Fig. 1. This consists of a rocker arm 61 pivotally mounted at 62 to a bracket 63, and having its lower end bifurcated to engage an annular groove between two collars 64 fixed on the connecting shaft 53. The upper end of the rocker arm 61 by means of a link connection 65 controls a gas valve in the carbureter 5. Thus if the front tractor unit should either slow up or increase in speed relative to the rear tractor unit the device just described will decrease or increase the flow of gas to the engine in the rear unit as the case may be, which will in turn adjust the power and speed of said rear unit to equal that of the front tractor unit.

In Fig. 10 is shown a top view of the double unit tractor showing the method of controlling the steering mechanism as well as other mechanisms on both units by single operations. The shaft 25 is replaced in the front tractor unit by a shaft 25ª which extends back in a slotted extension 79, the slot being engaged by a pin 80 secured in the bifurcated end of a rod 81. The rear end of the rod 81 is provided with a pinion 82 which meshes with a pinion 83 on the shaft 25. Thus the slotted connection allows for any varying in distance between the two tractor units, while the pinions 82 and 83 reverse the steering of the front tractor wheels to those of the rear which is required. A similarly constructed controlling rod 84, 85 is also shown in Fig. 10. Each controlling rod may have one or more universal joints such as 95, to allow for the opposite swinging movements of the tractor units in steering. With two power units such as described it is necessary to use controls of this kind for all controlling purposes but those shown are sufficient for sake of illustration. In Fig. 10 is shown also how bevel gears 86 and 87 can replace the worm gear steering arrangement as shown in Figs. 8 and 9.

In Fig. 11 is illustrated how the steering arrangement can be applied to the front wheels in the single tractor. The traction wheels in this case do not have the hub construction shown in Fig. 7, but are of common construction and driven by sprocket gears and chains in the same manner as described for the single tractor shown in Fig. 6. The shaft 25 is here replaced by a longer shaft 25ᵇ, which is provided at its front end with a crank arm 88. Each of the front wheel hubs is pivotally mounted at 89 and crank arms 90 which are connected by a link 91. One of the wheel hubs is also provided with a crank arm 92 which is pivotally connected by a link 93 to the crank arm 88. Turning of the shaft 25ᵇ by the steering wheel (omitted in Fig. 11) will thus turn the front wheels and steer the tractor.

The hitching device shown in Figs. 12 and 13 is also a very adaptable construction for using when it is desired to hitch to the tractor other vehicles or machinery such as plows, cultivators, etc.

It is understood that the above combinations can be used in a variety of forms and structures if within the scope of the appended claims.

Having now therefore fully shown and described our invention, what we claim to be new and desire to protect by Letters Patent is:

1. A double unit tractor consisting of two tractor units one in front of the other, an engine in each unit, two drive wheels supporting each tractor unit and adapted to be driven by the respective unit engines, a connecting shaft secured to the front unit and slidably mounted in the rear unit, means for equalizing the draft between said two tractor units.

2. A double unit tractor consisting of two power operated tractor units placed one in front of the other, a connecting shaft secured at its front end to the front tractor unit, a holder having a longitudinal recess secured to the rear tractor and adapted to slidably engage the rear portion of said connecting shaft, a draft bar slidably supported in the rear portion of said recessed holder, a pulley mounted in said draft bar, a cable passing over said pulley and having one of its ends secured to said connecting shaft and the other end secured to said holder.

3. A double unit tractor consisting of two tractor units positioned one in front of the other, a gas engine in each tractor unit, a connecting shaft secured to the front tractor unit and slidably supported in the rear tractor unit, a carbureter adjusting device secured to the rear tractor unit and operatively connected with said connecting shaft, whereby said carbureter will be automatically adjusted as said connecting shaft assumes various positions relative to said rear tractor unit.

4. A double unit tractor consisting of two tractor units one in front of the other, two tractor wheels supporting each tractor unit and adapted to steer the same, steering arms extending from the hubs of said wheels, a link bar pivotally secured at its end to the steering arms on each tractor unit, a manually operated steering shaft mounted upon the rear tractor unit and operatively connected to the steering arms of the wheels of said tractor unit, a secondary steering shaft journaled with one end in each tractor unit and operatively connected to the steering arms of the front tractor wheels, means for rotating said steering shafts in opposite directions, said secondary steering shaft being in two sections slidably secured together for the purpose specified.

5. A double unit tractor consisting of two wheel supported tractor units positioned one in front of the other, an engine in each tractor unit, a connecting shaft secured to one tractor unit and slidably supported in the other tractor unit, a lever pivotally mounted to one tractor unit, and having one end operatively connected to the power controlling element of the engine in said tractor unit, the other end of said lever being operatively connected to said connecting shaft.

6. A double unit tractor consisting of two wheel supported tractor units positioned one in front of the other, an engine in each tractor unit, a connecting shaft secured to the front tractor unit and slidably supported in the rear tractor unit, power adjusting means connected with the engine in the rear tractor unit, a lever pivotally mounted on said rear tractor unit and connected at one end to said power adjusting means, the other end of said lever being operatively connected to said connecting shaft.

7. A double unit tractor consisting of two wheel supported power operated tractor units positioned one in front of the other, a connecting shaft secured at its front end to the front tractor unit and having its rear end slidably supported in a longitudinal recess in the rear tractor unit, a draft bar slidably supported in said rear tractor unit, equalizing mechanism whereby the draft on said draft bar will be equal from each tractor unit.

8. A double unit tractor consisting of two wheel supported power operated tractor units positioned one in front of the other, a connecting shaft secured at one end to the front tractor unit and having its rear end supported in a longitudinal recess in the rear tractor unit, a draft bar slidably supported in said rear tractor unit, a pulley mounted in said draft bar, a cable passing over said pulley and having one of its ends secured to said rear tractor unit and having its other end secured to said connecting shaft.

9. A double unit tractor consisting of two wheel supported tractor units positioned one in front of the other, a gas engine in each tractor unit, a connecting shaft secured to the front tractor unit and slidably supported in the rear tractor unit, a lever pivotally mounted on the rear tractor unit, a carbureter adjusting device connected to one end of said lever, the other end of said lever being operatively connected to said connecting shaft.

10. A double unit tractor consisting of two tractor units positioned one in front of the other, traction wheels supporting each tractor unit, a steering mechanism on the rear tractor unit adapted to steer the wheels thereof, means for steering the wheels of the front tractor unit and operative connection between the same and said steering mechanism, whereby the wheels of the respective tractor units will be simultaneously steered in opposite directions.

11. A double unit tractor consisting of two tractor units positioned one in front of the other, traction wheels supporting each tractor unit and adapted to steer the same, steering arms extending from the hubs of said wheels, a steering post and operative connection between the same and said steering arms, whereby the wheels of the respective tractor units will be simultaneously steered in opposite directions.

12. A double unit tractor consisting of two tractor units positioned one in front of the other, traction wheels supporting each tractor unit and adapted to steer the same, steering arms extending from the hubs of said wheels, a link bar pivotally secured at its ends to the steering arms on each tractor unit, a steering post and operative connection between the same and said steering arms whereby the wheels of the respective tractor units will be simultaneously steered in opposite directions.

13. A double unit tractor consisting of two tractor units positioned one in front of the other, traction wheels supporting each tractor unit and adapted to be simultaneously steered in opposite directions, a steering mechanism on the rear tractor unit adapted to steer the wheels thereof, means for steering the wheels of the front tractor unit, a steering shaft operatively connecting said steering mechanism and said steering means.

14. A double unit tractor consisting of two tractor units positioned one in front of the other, traction wheels supporting each tractor unit and adapted to be simultaneously steered in opposite directions, a steering mechanism on the rear tractor unit adapted to steer the wheels thereof, means for steering the wheels of the front tractor unit, a steering shaft operatively connecting said steering mechanism and said steering means, said steering shaft consisting of two sections slidably secured together.

15. A double unit tractor consisting of two power operated wheel supported units positioned one in front of the other, means for connecting said tractor units, an engine in each tractor unit and mechanism for controlling the same, operative connection between said connecting means and one of said engine controlling mechanisms.

16. A double unit tractor consisting of two tractor units positioned one in front of the other, an engine in each tractor unit, traction wheels supporting each tractor unit and adapted to be driven by said engines, a mechanism for adjusting the power and speed of the engine in one tractor unit and operative connection between said mechanism and the other tractor unit, whereby variance in distance between the tractor units will actuate said adjusting mechanism.

17. A double unit tractor consisting of two wheel supported tractor units positioned one in front of the other, an engine in each tractor unit, a connecting shaft secured in one tractor unit and slidably supported in the other tractor unit, an engine adjusting mechanism in said second mentioned tractor unit and operative connection between said mechanism and said connecting shaft.

18. A double unit tractor consisting of two tractor units positioned one in front of the other, traction wheels supporting each tractor unit, a steering mechanism on one tractor unit adapted to steer the wheels thereof, means for steering the wheels of the other tractor unit and operative connection between the same and said steering mechanism, whereby the wheels of the respective tractor units will be simultaneously steered in opposite directions.

19. A double unit vehicle consisting of two frames positioned one in front of the other, each frame being transversely pivotally mounted on suitable supporting wheels, connecting means between said vehicles adapted to retain said frames in constant longitudinal alinement, a longitudinal pivot adapted to secure said connecting means to one of said units.

20. A double unit structure consisting of two vehicles positioned one in front of the other, supporting wheels adapted to carry each of the vehicles, said wheels being adapted to be turned on vertical pivots so as to steer the structure, and a connecting device between the vehicles for maintaining them in constant longitudinal alinement, said connecting device permitting relatively transverse rocking motion of the vehicles.

21. A double unit vehicle consisting of two frames positioned one in front of the other, said frames being tiltably supported on suitable ground wheels, means for connecting the frames and retaining them in constant longitudinal alinement, said means comprising a longitudinal pivot device adapted to permit relatively transverse rocking motion between the frames.

In testimony whereof we affix our signatures.

ANDREAN G. RONNING.
ADOLPH RONNING.